Figure 1:
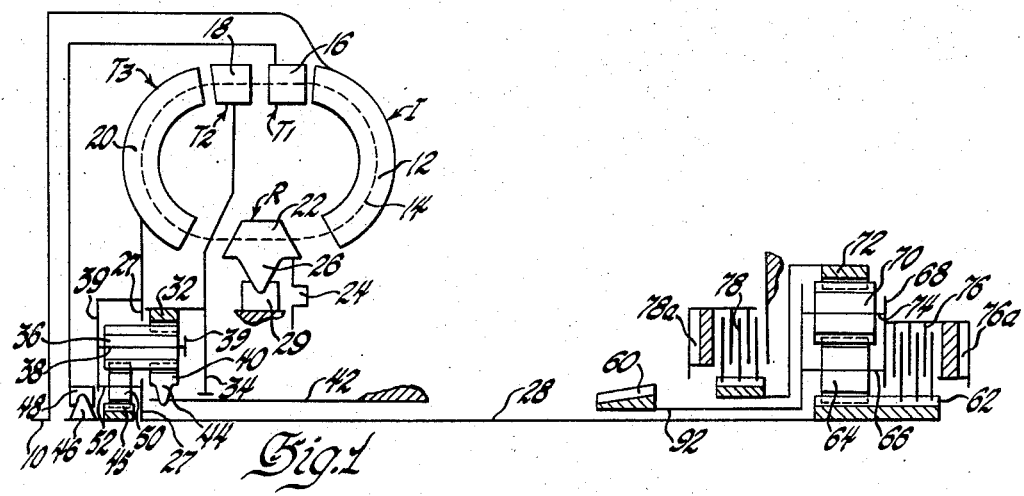

July 7, 1959     O. K. KELLEY     2,893,266
TRANSMISSION

Filed May 24, 1956     3 Sheets-Sheet 1

INVENTOR.
Oliver K. Kelley
BY
T. L. Chisholm
ATTORNEY

July 7, 1959

O. K. KELLEY 2,893,266

TRANSMISSION

Filed May 24, 1956

3 Sheets-Sheet 2

INVENTOR.
Oliver K. Kelley
BY
ATTORNEY

July 7, 1959

O. K. KELLEY 2,893,266

TRANSMISSION

Filed May 24, 1956

3 Sheets-Sheet 3

INVENTOR.
Oliver K. Kelley
BY
T. L. Chisholm
ATTORNEY

UnitedStates Patent Office 2,893,266
Patented July 7, 1959

2,893,266

TRANSMISSION

Oliver K. Kelley, Bloomfield Hills, Mich., assignor to General Motors Corporation, Detroit, Mich., a corporation of Delaware Application May 24, 1956, Serial No. 586,980

6 Claims. (Cl. 74—677)

This invention relates to transmissions for motor vehicles. In the present day tendency to build lower cars, success is limited, among other ways by the ground clearance required for the transmission, particularly where the transmission has a hydrodynamic torque converter which is frequently of large diameter.

It has also been proposed in transmissions having such torque converters, whether located conventionally or not, to provide a series of turbines which successively receive liquid in the working circuit from an impeller and transmit torque to an output shaft through connections having successively decreasing speed ratios. While these transmissions which have come to my attention have operated satisfactorily, they have been expensive and complicated because of the nature of the gearing heretofore required to transmit torque successively from the turbines to the output shaft and because of the requirement to have pressure operated friction devices for sustaining torque reactions to complete the drive through the transmission.

One of the objects of this invention is to provide an improved transmission particularly of the hydrodynamic type in which the conformation and arrangement of the parts of the transmission permit the transmission to be mounted at a relatively high level in the car so that the size of the transmission, especially of a torque converter, does not reduce ground clearance nor seriously interfere with occupants of the car nor the height of the floor.

Another object is to provide an improved transmission which is compact and economical to manufacture and to service particularly one which is readily adapted to be mounted in or upon the customary differential housing. In carrying out this object of the invention it is more specifically an object to provide a hydrodynamic transmission in which a wide range of torque ratios is automatically obtained without the shifting of gears or the setting or releasing of friction devices, the only friction devices being those necessary to set the forward and reverse gear. This facilitates mounting the reverse gear physically separate from the main body of the transmission and in a location where it can be easily serviced and adjusted without disturbing the transmission proper.

It is also an object of this invention to provide an improved and simplified gearing arrangement for continuously transmitting torque both simultaneously and successively from a number of turbines to a single output shaft and to do this without friction connections or friction reaction members which require either manual or automatic operation by pressure-responsive devices.

Figure 3:
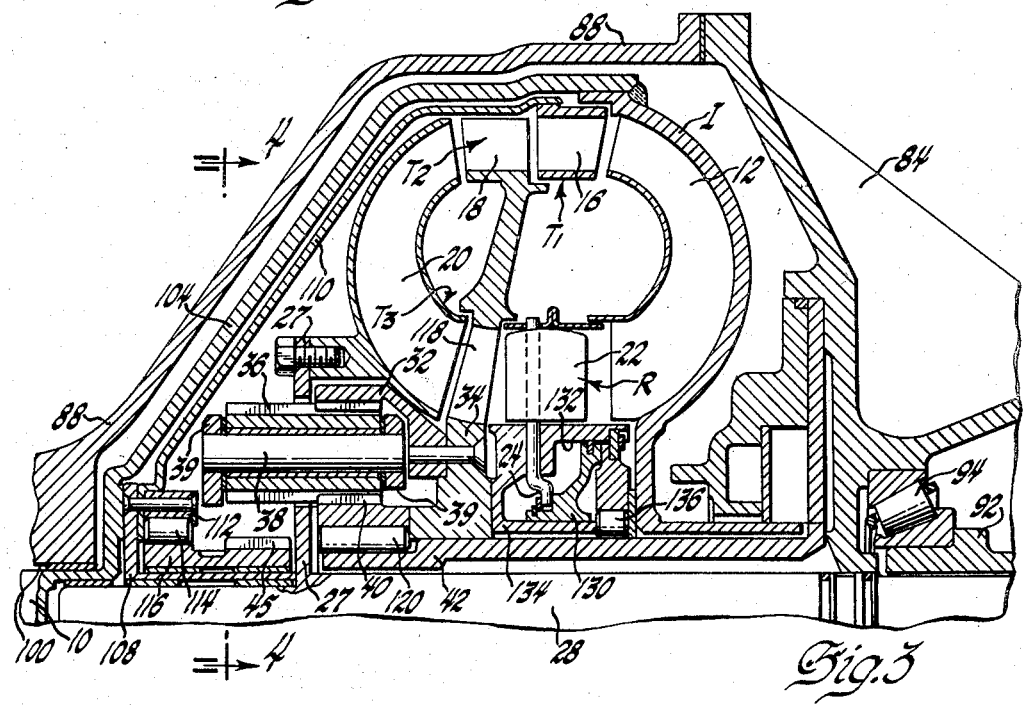
Figure 2:
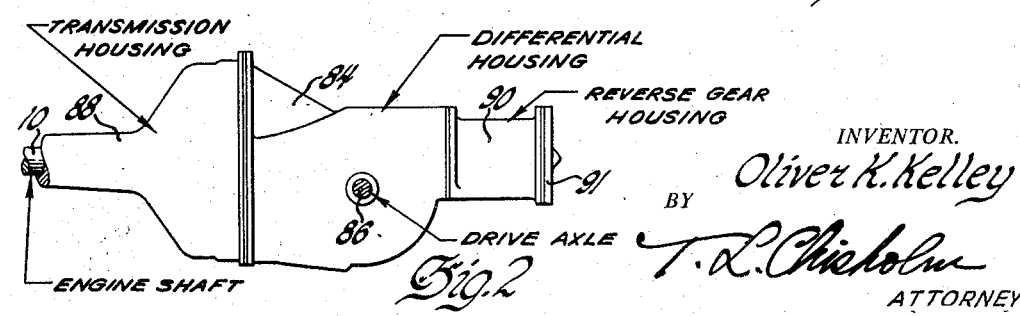
Figure 4:
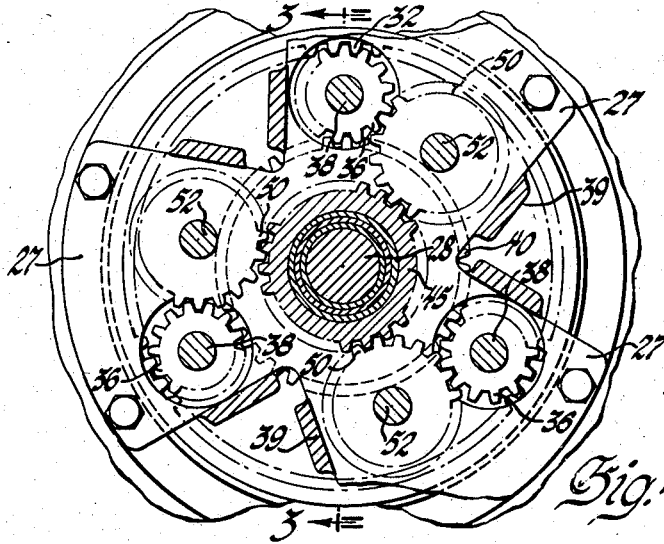
Figure 5:
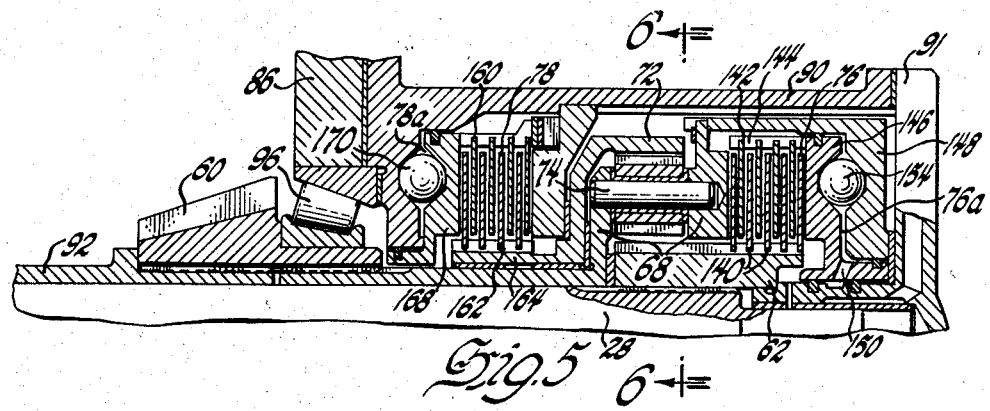
Figure 6:
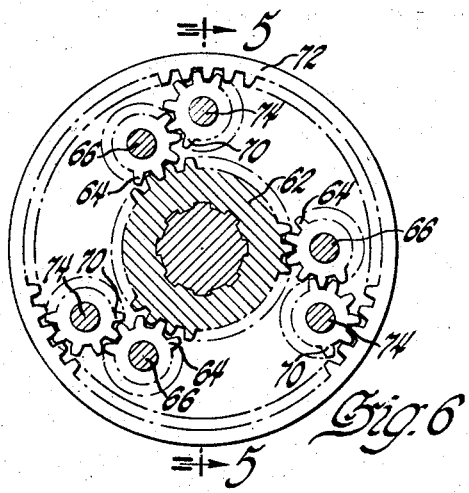
Figure 7:
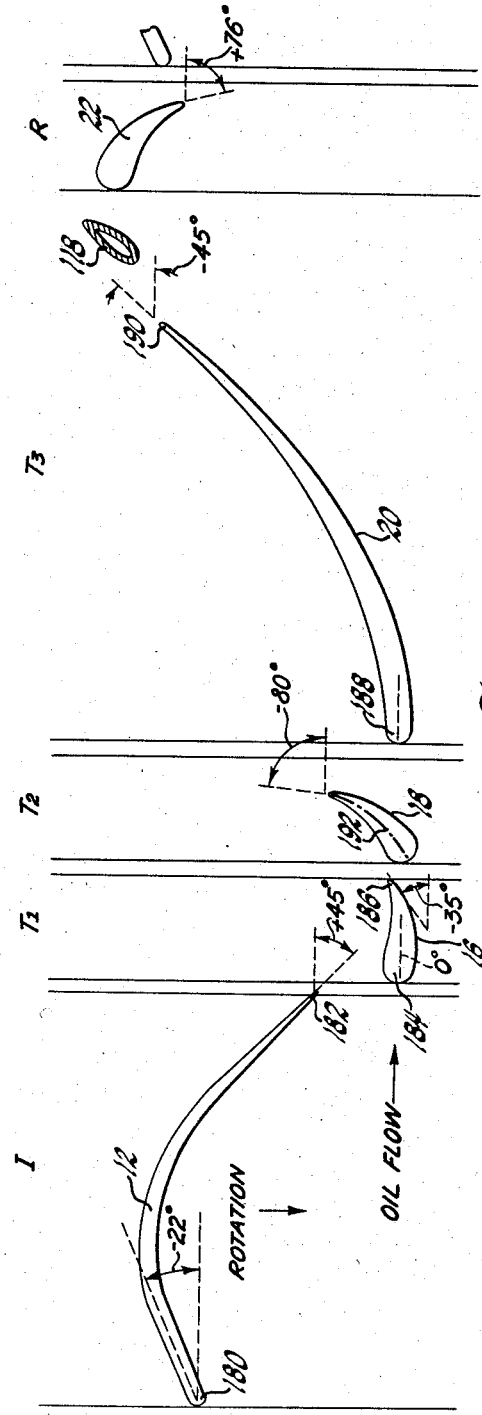
Figure 8:
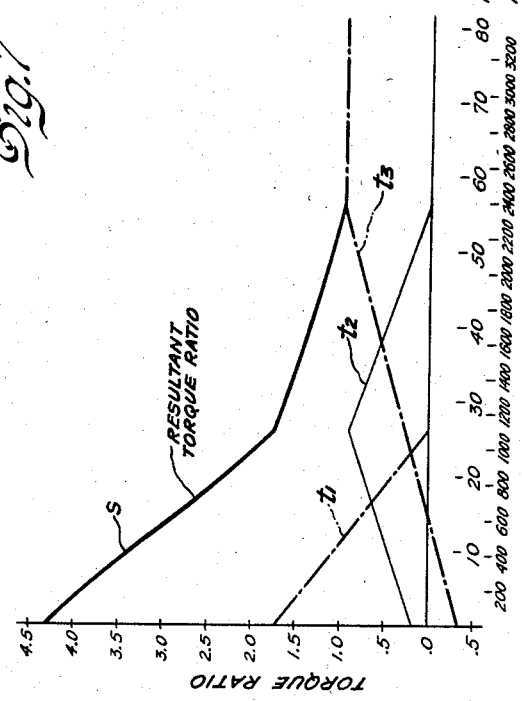

These and other objects of the invention will be apparent from the following description and the accompanying drawings, in which:

Fig. 1 is a diagrammatic illustration of one form of transmission and reversing gear embodying the invention, Fig. 2 is a side elevation of a transmission and reversing gear embodying the invention, Fig. 3 is one-half of a symmetrical longitudinal section of the structure of the transmission proper, taken parallel to the plane of the papers in Fig. 2, on an enlarged scale, and being on the line 3—3 of Fig. 4, Fig. 4 is a section of the gearing associated with the hydrodynamic transmission and taken on the line 4—4 of Fig. 3, Fig. 5 is one-half of a symmetrical longitudinal section of the reversing gear, taken parallel to the plane of the paper in Fig. 2 and being in effect an extension of Fig. 3. Fig. 5 is also a section on the line 5—5 of Fig. 6, Fig. 6 is a section of the forward and reverse gearing on the line 6—6 of Fig. 5, Fig. 7 is a developed view of axial sections of the torque converter blades, and Fig. 8 is a graph of representative values of the torques exerted by the several turbines.

Referring to Fig. 1, the transmission includes an input or engine shaft 10 driving a pump or impeller I of a hydrodynamic torque converter of generally known form, the impeller being represented diagrammatically in Fig. 1 by a single blade 12 which circulates working liquid in a closed toroidal path the centerline which is represented by the broken line 14. A first turbine $T_1$ represented in Fig. 1 by a single blade 16 receives liquid from the impeller and discharges it in an axial direction to a second turbine $T_2$ represented in Fig. 1 by the single blade 18 which is also an axial flow turbine and which discharges liquid to a third turbine $T_3$ represented by a single blade 20 which is preferably of the radial inflow type. The third turbine $T_3$ discharges liquid to a reaction member or guide wheel R represented by a single blade 22 the pitch of which is adjustable by a shaft having a crank 24. The entire reaction member is rotatably mounted on the frame of the transmission, and is one-way braked to the frame by any suitable device known in the art as a ratchet, free-wheeler, over-running device or one-way device. The free-wheeler is represented in Fig. 1 by the ratchet blade 26 rigdly secured to the reaction member R and lying in front of the stationary member 29. This symbolically represents that the blade 26 and reaction member R can rotate forward, that is out of the plane of the paper in Fig. 1 toward the observer, but cannot rotate backward away from the observer because the blade 26 is blocked by the member 29. As used herein, the term one-way device or over-running device has its customary engineering meaning, namely a free-wheeler which permits one member to rotate with respect to a second member in one sense of rotation only. If the one member tends to rotate in the opposite sense with respect to the second member the free-wheeler prevents such relative rotation and, if both members are rotatable, compels the two members to rotate together. Thus the first member can rotate faster than the second, but never slower. But if the second member is held stationary the first member can rotate absolutely in one sense only, and is held fast if it tends to rotate in the opposite sense. In this latter case, the free-wheeler functions as a one-way brake. If both members are rotatable the free-wheeler is an over-running clutch. In Fig. 1, 26 represents a one-way brake.

The drive may be more easily understood by considering the third turbine $T_3$ first. This is the principal turbine which delivers the entire torque of the transmission after the car speed has attained a predetermined relationship to engine speed, $T_3$ being rigidly connected to a flange 27 on the converter output shaft 28. This provides the connection of lowest range of torque ratios whose terminal value is one-to-one, between the turbines and the output shaft.

The second turbine $T_2$ is adapted to drive the output shaft through a connection of a higher range of speed ratios, including a ring gear 32 rigidly attached to the hub 34 of turbine $T_2$ and meshing with each of a plurality of long planet pinions 36, mounted on spindles 38 carried by the planet carrier 39 which forms part of the flange 27 or is otherwise rigidly connected to it. The planet pinions 36 mesh with a reaction sun gear 40 mounted for forward but not backward rotation on a ground sleeve 42 rigidly attached to the frame of the transmission. Forward rotation is permitted and backward rotation prevented by any suitable one-way device (specifically a brake here) represented by the blade 44 rigidly attached to the sun gear 40 and lying in front of a stationary part represented by the ground sleeve 42.

Forward rotation of the ring gear 32 rotates the long planets 36 forward, and if the car resists rotation of the output shaft 28, the long planets 36 rotate on their spindles 38 thus tending to rotate the sun gear 40 backward. This locks the sun gear to sustain the torque reaction and causes the long planets to walk around the now stationary reaction gear 40. This drives the carrier 39 forward, the torque of $T_2$ (multiplied by the ratio of the gear-set 32—36—40) being added to the torque, if any, of the third turbine $T_3$, and so drives the car, or assists $T_3$ to drive it, according to the instantaneous hydrodynamic conditions in the torque converter, as will be explained. However, if $T_3$ is rotating faster than $T_2$ can drive the carrier 39, the carrier (and the planet pinions 36) become the power input member of the planetary gearset, and the pinions carry forward both the ring gear 32 and the sun gear 40. The free-wheeler 44 breaks away and $T_2$ can transmit no torque to the output shaft, being in effect disconnected from the drive.

$T_1$ is arranged to drive the carrier 39 through another speed reducing gear of higher ratio than the planetary gearset 32—36—40. To this end $T_1$ is connected to drive only forwardly an input sun gear 45 through an overrunning clutch represented in Fig. 1 by the blade 46 connected rigidly to the sun gear 45 and lying in front of a block 48 rigidly connected to $T_1$. The long planets 36 extend axially over the input sun gear 45 and thus the group of planets surrounds it. Between this sun gear and long planets 36 are a number of short planet pinions 50, journalled on shafts 52 in the carrier 39. Each of the short pinions 50 meshes both with the sun gear 45 and one of the long planets 36, so that each long pinion 36 meshes with the input ring gear 32 driven from $T_2$, with the reaction sun gear 40, and with the short planets 50 driven from $T_1$.

The first turbine $T_1$ is adapted to drive the input sun gear 45 forward which, through the short pinions 50 is adapted to rotate the long pinions 36 forward (clockwise in Fig. 4) and this tends to cause the long pinions 36 to walk around the reaction sun gear 40 to drive the carrier forward. Thus, whenever $T_1$, through the reduction gearing 45—50—36—40 tends to rotate the carrier faster than it can be driven by $T_2$ and/or $T_3$, then $T_1$ adds its torque to the torque, if any, produced by $T_2$ and $T_3$ and drives the car or assists in driving it, according to instantaneous hydrodynamic conditions in the torque converter, as will be explained. But whenever the carrier 39 is driven by $T_2$ and/or $T_3$ faster than $T_1$ can drive it, the free-wheeler 46 breaks away and $T_1$ is disconnected from the system.

The converter output shaft 28 may drive any suitable form of final drive mechanism represented diagrammatically in Fig. 1 by the pinion gear 60 of any known differential gearing. Between the drive shaft 28 and the gear 60 is any suitable forward and reverse gear, for example that shown diagrammatically in Fig. 1 and structurally in Figs. 5 and 6.

The shaft 28 drives an input sun gear 62 which meshes with a plurality of planet gears 64 mounted on spindles 66 in a carrier 68 and meshing in turn with short planet gears 70 which mesh with a ring gear 72 but not with the sun gear. The short gears 70 are mounted on spindles 74 in the carrier 68. The carrier is keyed to the output gear 60. When the carrier 68 is locked in the sun gear 62 by the forward clutch 76 (set by pressure chamber 76a) the shaft 28 drives the final gear 60 forward at the same speed. When the clutch 76 is released and the ring gear 72 is held by the brake 78 (set by pressure chamber 78a) the gear 60 is driven backward at reduced speed.

The transmission is preferably placed in a casing associated with the final drive of the car. In Fig. 2 a differential housing 84 contains any suitable form of final drive (not shown) which includes the drive shaft gear 60 (Fig. 5) and any known differential mechanism for driving output shafts or drive axles 86, which are connected to the rear wheels through universal joints as in the well-known De Dion drive, in which the differential housing is supported by the car springs. This reduces the unsprung weight which is thus confined to the wheels, brakes and drive shafts 86.

A transmission housing 88 is detachably secured to the front of the differential housing 84, and contains the converter and its associated gearing represented in Fig. 1. A reverse gear housing 90 having a cover plate 91 is removably secured to the back of the differential housing 84 and contains the reverse gear represented in Fig. 1. This arrangement provides a compact and unitary transmission and final drive mechanism all of which can be supported on the car springs and which can be located high above the ground to permit the lowermost part of the torque converter, which may be of large diameter, to have the desired ground clearance without raising the floor or seats of the car. This is because the transmission, being located near the rear axle, can be mounted in the trunk of the car behind the usual seats, and power can be transmitted to it from the engine by a drive shaft of small diameter and including universal joints if desired.

One form of actual structure of the transmission within the housings is shown collectively in Figs. 2 and 5. The transmission output shaft 28 extends from the front of the transmission housing 88 through the differential housing 84 and into the reverse gear housing 90. The shaft 28 is supported within a hollow shaft 92 which is keyed to the output gear 60 and is supported by the front bearing 94 and the rear bearing 96 which latter supports the gear 60 in the differential housing. The front of the transmission housing 88 carries a bore 100 which supports by any desired radial bearing the bell end of engine drive shaft 10 which in turn has a cylindrical inner surface which receives the front end of the converter output shaft 28 and any desired bearing therefor. The shaft 10 is connected to a bell 104 to which is secured the impeller I, which with the bell 104 forms a closed container for the working liquid of the converter. The shaft 28 rotatably supports, through any desired radial bearings a hub 108 for the first turbine $T_1$. This turbine is connected to the hub 108 by a bell 110, and there is riveted to the hub the outer race 112 (which corresponds to block 48 in Fig. 1) of a free-wheeler having rollers or sprags 114 supported by an inner race 116 which may be integral with sun gear 45, which may turn on radial bearings on the hub 108. The rollers or sprags correspond to the blade 46 in Fig. 1.

The shaft 28 may be integral with the flange 27 which is bolted to the third turbine, and which, as shown in Fig. 4, is part of the planetary carrier 39. This carrier supports the spindles 38 for the long planets 36 (Fig. 3) and the spindles 52 for the short planets 50 (Fig. 4). The reaction sun gear 40 forms the outer race of the free wheeler including sprags or rollers 120 mounted on an inner race formed in the end of the ground sleeve 42. The rollers 120 correspond to the blade 44 in Fig. 1. The ring gear 32 may be formed on a flange riveted to the hub 34 of turbine $T_2$ as shown in Fig. 3 from which hub the turbine is supported by spokes 118.

The reaction blades 22, as shown in Fig. 3, are mounted on shafts, each having a crank 24 disposed in an annular groove in an annular piston 130 movable to adjust the angles of the blades, in a cylinder 132 formed in a stator hub 134 which is freely rotatable forward on the ground sleeve 42, but is prevented from rotating backward by a one-way device, specifically a brake, including sprags or rollers 136 which correspond to the blade 26 in Fig. 1. The piston 130 can be positioned by hydraulic pressure in the cylinder 132, controlled in any suitable manner to hold the blades 22 at the desired angle.

As shown in Figs. 5 and 6 the rear end of the converter output shaft 28 is keyed to the sun gear 62 meshing with the planets 64 (Fig. 6) turning on spindles 66 in the carrier 68 and in turn meshing with planets 70 meshing with ring gear 72 and turning on spindles 74 in the carrier 68. The clutch 76 is formed by driving plates 140 splined to the sun gear and driven plates 142 splined to a drum 144 keyed to a piston 146 in a cylinder 148 keyed to the carrier. When fluid under pressure is admitted to the space 76a in the cylinder through passage 150 from any suitable source not shown the piston 146 engages the clutch to lock up the planetary gear set to drive the output gear 60 which is keyed to the tubular shaft 92 forming part of the carrier. The action of the fluid under pressure in space 76a may be assisted by a self-energizing device of any known form including the balls 154 disposed in cam depressions in the piston 146 and end wall of the cylinder 148.

The reverse brake 78 is formed by stationary brake disks 160 and driven disks 162 keyed to a drum 164 integral with the ring gear 72. When fluid under pressure is admitted to the cylinder 78a by any suitable passage, not shown, the piston 168 sets the brake to hold the sun gear to drive the output gear backward. Its action can be assisted by balls 170 similar to balls 154.

The cover plate 91 can be removed to repair or replace parts of the reversing gear.

It is inherent in torque converters of this kind that the hydraulic torque on a given turbine is highest at stall, that is when the turbine is stationary and the impeller is circulating liquid at a significant rate, and that the torque of the turbine decreases as the speed of the turbine approaches the speed of the impeller. Also it is generally true that if the turbine is designed to give high torque on starting it does not sustain as high torque as is desired over a long range of speed, and is not efficient at coupling, that is when the turbine runs near turbine speed and no torque multiplication is desired. Based on these considerations it is an object of my invention to construct and arrange the hydraulic torque converter and its associated gearing so that the following two characteristics are obtained:

(1) On starting the car, that is at stall and during initial low car speeds, the hydraulic torque impressed on $T_1$ is higher than the torque on $T_2$, which in turn is higher than the torque on $T_3$; also the mechanical connection of $T_1$ to the output shaft 28 has a lower speed ratio or higher mechanical advantage than the speed ratio of the connection of $T_2$ to the same shaft, and in turn the connection of $T_2$ to the shaft has a higher speed ratio than that of $T_3$, which latter is unity. As one example the speed ratio of the connection of $T_1$ through the gearing 45–50–36–40–39 may be about 2.5 to 1, and the speed ratio of the connection of $T_2$ through the gearing 32–36–40–39 may be about 1.6 to 1.

(2) As the torque ratio of $T_1$ inherently decreases with increasing turbine speed, the torque ratios of $T_2$ and $T_3$ both increase; and after the torque of $T_1$ vanishes at the terminal speed of $T_1$ and as a result the torque ratio of $T_2$ inherently decreases with increasing turbine speed, the torque ratio of turbine $T_3$ continues to increase to a maximum which is obtained at coupling, which occurs when the torque of $T_2$ vanishes at its terminal speed.

It will be noted that when $T_1$ starts to drive the car through its gearing connection the input sun gear 45 positively rotates backward the short planets 50 which positively rotate forward the long planets 36 which tend to rotate backward the reaction sun gear 40 which is locked by the ratchet device so that the long planets 36 rotate the carrier forward to drive the output shaft 28. In so doing it is unavoidable that the long planets 36 positively drive forward the ring gear 32 and the second turbine $T_2$ at a definite ratio of speed with respect to the speed of turbine $T_1$. This is true whether or not the oil also drives the $T_2$ blades 18 at this speed. Also, since the output shaft 28 is being driven forward the third turbine $T_3$ is positively carried forward mechanically at the speed of the output shaft whether or not the oil is also driving the $T_3$ blades at this speed. When the speed of $T_2$ divided by 1.6 exceeds the speed of $T_1$ divided by 2.5, the free wheeler 46 breaks away and $T_1$ is disconnected from the drive, as has been explained. In such case $T_2$ is driving the car and $T_3$ is rotating at a definite speed ratio with respect to $T_2$ whether or not the oil is driving the $T_3$ blades 20 at that speed. As the torque on $T_3$ increases and its speed, due to the oil increases, the speed of $T_3$ eventually becomes greater than the speed of $T_2$ divided by 1.6, and the free-wheeler 44 breaks away disconnecting $T_2$ from the drive.

When $T_1$ is connected to the output shaft its torque characteristics are very similar to what they would be if there were no other turbine in the converter, but it importantly influences the torque characteristics of the downstream turbines $T_2$ and $T_3$. When $T_1$ becomes disconnected from the output shaft it idles in the stream of oil and does not significantly change the direction of oil leaving the impeller and striking $T_2$. Therefore, $T_2$ has torque characteristics very similar to what they would be if there were no other turbine in the converter, but $T_2$ importantly influences the torque characteristics of $T_3$ until $T_2$ free wheels, after which $T_3$ becomes the only effective turbine in the oil circuit and has the same characteristics it would have if $T_1$ and $T_2$ were removed from the converter.

The speed and torque relationships of the turbines individually and acting together are plotted in Fig. 8 wherein abscissae are speeds of the output shaft and car speed and ordinates are torque multiplication for a given constant throttle position of the engine, representing a constant torque input on the impeller I.

In Fig. 8 the line $t_1$ represents the range of torque exerted by the turbine $T_1$ alone, $t_2$ represents the range of torque of the turbine $T_2$ as it is influenced by the presence of $T_1$, $t_3$ represents the range of torque of $T_3$ as influenced by the other turbines. The curve S marked resultant torque ratio shows the sum of the instantaneous torque ratios on each individual turbine multiplied by the mechanical advantage of the gearing by which it is connected to the output shaft and taking into account the algebraic sign or direction of the torque.

At stall, that is before the car has begun to move, the turbine $T_1$ exerts a torque on sun gear 45 approximately 1.75 times engine torque at the selected throttle opening. Assuming the throttle is not changed, as the car begins to move and its speed increases the torque impressed on the turbine $T_1$ by the oil gradually decreases, as is well known, and this torque ultimately disappears and the point is reached at which there is substantially no change in direction of the oil by the $T_1$ blades and consequently no torque is imposed on them. This occurs at the terminal speed of $T_1$. In the example illustrated the torque of $T_1$ will disappear at approximately 1100 r.p.m. output shaft speed, representing about 26 miles per hour in a typical car in which $$\frac{N}{V}=42.5$$

where $N$=r.p.m. of the output shaft 28 and $V$=miles per hour, car speed.

The line $t_2$ shows the range of torque ratios of the second turbine $T_2$ in the assembled torque converter under the conditions related above in connection with $T_1$.

At stall the torque impressed on $T_2$ is relatively low, being about .2 times engine torque. As the car speed increases the hydraulic torque impressed on $T_2$ increases because $T_1$ rotates at a higher speed than $T_2$ as determined by the planetary gearing and therefore as the rotational speed of $T_2$ increases oil is delivered from $T_1$ to $T_2$ with a greater tangential component relative to $T_2$. Thus the hydraulic torque impressed on $T_2$ builds up to a maximum value which may be about 0.9 times engine torque and it will be noted that the torque of $T_2$ is increasing while the torque of $T_1$ is decreasing. When $t_1$ becomes zero the turbine $T_1$ reaches the point where it exerts no torque and the free-wheeler 46 breaks away letting the sun gear 45 turn forward and letting $T_1$ float idly in the oil stream, where for all practical purposes it is out of operation. When this occurs $T_2$ receives oil at the speed and in the direction in which the oil leaves the impeller and as the car speed increases the torque impressed on $T_2$ gradually decreases, as is well known. Subsequently, the speed of $T_2$ reaches a point where $T_2$ does not change the direction of oil and the turbine $T_2$ exerts no torque. At this point, which is at the terminal speed of turbine $T_2$, the free-wheeler 44 breaks away and the turbine $T_2$ floats idly in the stream of oil. This point is indicated where the line $t_2$ in Fig. 8 reaches zero, which is about 2400 r.p.m. or about 55 miles per hour car speed.

The line $t_3$ shows the range of torque ratios of the third turbine $T_3$ under the foregoing conditions. At stall negative torque may be impressed on $T_3$ because the blades of $T_2$, held stationary by the wheels of the car, direct oil to the back sides of the blades 20, as will be apparent from Fig. 7. This negative value at stall may be as much as 0.4 times engine torque but as the car begins to move and the speed increases the angle of the oil discharged by $T_2$ and $T_3$ has an increasingly greater tangential component in the direction of rotation and the negative torque impressed on $T_3$ gradually decreases and soon becomes positive. The torque of $T_3$ increases in fact to the point where $T_2$ breaks away and free wheels, at which time the torque of $T_3$ is approximately equal to engine torque and coupling occurs. As stated above this may be at about 2400 r.p.m. or 55 miles per hour. Thereafter $T_3$ alone drives the car at one-to-one ratio, neglecting losses, and $T_1$ and $T_2$ idle.

The curve S represents the total torque delivered by the torque converter. Each point on this curve is the algebraic sum of the torque multiplications of the individual turbines $T_1$, $T_2$ and $T_3$, each multiplied by the mechanical advantage of the gearing through which each of these turbines drive the output shaft. Thus the ordinates of $t_1$ are multiplied by 2.5 and added to the ordinates of $t_2$ multiplied by 1.6 and added algebraically to the ordinates of the curve $t_3$ to obtain the ordinates of the curve S. Therefore at stall although the turbine $T_3$ exerts negative torque on the output shaft, the entire torque converter has a high positive torque ratio because the negative torque is more than overcome by the torque of the first turbine multiplied by its gear ratio. At stall the torque ratio of the torque converter as a whole is about 4.3, as shown by the curve S. The torque ratio of the torque converter as a whole decreases as the car speed increases until at about 55 miles per hour the torque ratio is substantially unity and coupling occurs. It will be observed that about 55 miles per hour the curve S and $t_3$ coincide indicating that the first and second turbines are free wheeling and the third turbine alone is driving the car.

The above described torque characteristics are obtained by the shape and angular dispositions of the various blades of the torque converter. Fig. 7 shows an example of blade shape and arrangement which will produce the results plotted in Fig. 8. Fig. 7 is a developed or unrolled diagram of the cross sections or traces of the blades on a cylindrical surfaces determined by the line 14 in Fig. 1 and representing the flow of oil. Blades are represented as moving from the top toward the bottom of the drawing as shown by the rotation arrow, and oil is represented as flowing from left to right, as shown by the oil flow arrow.

Referring to Fig. 7 each blade has a generally air-foil cross section. The pump or impeller blade has a thin rounded nose 180 and a thin tail 182. The first turbine blades 16 have thick or blunt rounded noses 184 and somewhat thicker cross sections than the impeller blades terminating in tails 186. The $T_2$ blades are similar in shape to the $T_1$ blades but may be placed at a different angle. The $T_3$ blades have thin rounded noses 188 and thin sections terminating in thin or edge tails 190. The stator or reaction blades are similar in form to the $T_1$ and $T_2$ blades but are in general mirror images of them.

The entrance angle of a blade is the angle formed between a plane determined by the axis of the transmission and a radial line passing through the nose of the blade and a plane tangent at the nose to the camber surface of the blade. The camber surface may be roughly called the center plane of the blade and is that plane determined by the axes of all circular cylinders which may be placed within the blade so that each cylinder is tangent to both side surfaces of the blade. The trace of the camber surface of the blade in a plane of a cross section of the blade is the camber line of the blade. In Fig. 7 the camber line of the blade 18 is the dot-dash line 192.

Angles are measured between those portions of the determining planes which extend from the intersections of these planes in the direction of oil flow, and the angles are considered positive when measured from the radial and axial plane in the direction which the oil tends to move the blade. In Fig. 7 the entrance angle of incidence 180 of the impeller blade 12 is −22°.

Similarly the discharge angle is the angle formed between the plane tangent to the camber surface at the tail of the blade and the plane determined by the axis of the transmission and a radial line through the tail. In Fig. 7 the discharge angle of the impeller blade 12 is 45°.

The entrance angle of the blade 16 of turbine $T_1$ may be 0° and the discharge angle −35°. The entrance angle of blade 18 of $T_2$ may be about −45° and the discharge angle of $T_2$ may be about −80°. The entrance angle of $T_3$ blade 20 may be zero and the discharge angle may be about −45°. The discharge angle of the reaction blade 22 when in high performance position may be about 76°.

The entrance angle of the blade itself does not importantly affect the angle at which the oil is turned. Oil strikes the blade at a given direction which is wholly independent of the shape of the blade and it leaves the blade in a direction determined by the shape or angular disposition of the tail of the blade and the speed of movement of the blade. The entrance angle is chosen to reduce shock loss or spatter of the incident oil and so the angle affects the efficiency of the turbine but not its torque multiply characteristic.

The shapes and angular dispositions of the blades may be varied within the scope of the invention. Such variation, as is known, will change the torque-multiplying characteristics of the individual turbines and of the torque converter as a whole, but considerable variation is possible without changing the basic relationship by which downstream turbines increase their torque output and gradually and successively take over as upstream turbines decrease their torque and fade out.

The embodiments of the elements of the invention disclosed make possible combination of these elements in advantageous ways to produce an improved transmission. Each of the turbines with the impeller forms a hydrodynamic driving connection between the engine shaft and the planetary gearing. These driving connections have different ranges of torque ratios. The combination of the impeller and $T_1$ provides the highest range of torque ratios, the combination of the impeller and $T_2$ provides an intermediate range, and the combination of the impeller and $T_3$ provides the lowest range of torque ratios or the highest range of speed ratios. The combination of axial flow turbines and a radial inflow turbine, each having its characteristic individual speed-torque characteristics, makes possible the construction of a torque converter having a succession of turbines the torque of each of which increases while the torque of the turbine preceding it in the series decreases. This in turn simplifies the gearing wherein connections of progressively decreasing speed ratio connects successive turbines of the series to a single output shaft. The gearing is simple. The inherent torque characteristics of the turbines make possible the automatic connection of turbines to the output shaft and disconnection from it by only two over-running devices and without any devices which require setting by any system of control, whether manual or automatic.

I claim:

1. A hydrodynamic transmission comprising in combination, an impeller for circulating liquid in a working space, an output shaft, a first axial flow turbine which transmits torque to the output shaft at a relatively high mechanical advantage through a one-way connection to an input sun gear which drives a planetary idler gear which drives a second planetary gear which walks around a reaction sun gear one-way braked to the frame of the transmission, which planetary gears are journalled on a carrier connected to the output shaft, a second axial flow of turbine connected to drive a ring gear meshing with the second planetary gear and driving the carrier at a lower mechanical advantage than the first turbine and a third turbine of radial inflow type connected to drive the carrier at a still lower mechanical advantage.

2. A hydrodynamic transmission comprising in combination, an impeller for circulating liquid in a working space, an output shaft, a first turbine which transmits torque to the output shaft at a relatively high mechanical advantage through a one-way connection to an input sun gear which drives a planetary idler gear which drives a second planetary gear which walks around a reaction sun gear one-way braked to the frame of the transmission, which planetary gears are journalled on a carrier connected to the output shaft, a second turbine connected to drive a ring gear meshing with the second planetary gear and driving the carrier at a lower mechanical advantage than the first turbine, and a third turbine connected to drive the carrier at a still lower mechanical advantage.

3. A torque-multiplying power transmission comprising in combination a driving member, a driven member, a planet carrier connected to the driven member, a first planet gear journalled on the carrier, a first driving connection between the driving member and said carrier, an input gear meshing with the planet gear, a reaction gear meshing with the planet gear, means permitting forward rotation of the reaction gear and preventing reverse rotation thereof, a second and speed-reducing connection between the input gear and the driving member, a second planet gear journalled on the carrier and meshing with the first planet gear, an input sun gear meshing with the second planet gear, and a third and speed-reducing connection between the driving member and the input sun gear.

4. A torque-multiplying power transmission comprising in combination a driving member, a driven member, a planet carrier connected to the driven member, a first planet gear journalled on the carrier, a first driving connection between the driving member and said carrier, a ring gear meshing with the planet gear, a reaction sun gear meshing with the planet gear, means permitting forward rotation of the reaction sun gear and preventing reverse rotation thereof, a second and speed-reducing connection between the ring gear and the driving member, a second planet gear journalled on the carrier and meshing with the first planet gear, an input sun gear meshing with the second planet gear, a third and speed-reducing connection between the driving member and the input sun gear and a one-way clutch included in the third connection.

5. A torque-multiplying power transmission comprising in combination a driving member, a driven member, a planet carrier connected to the driven member, a first planet gear journalled on the carrier, a first driving connection between the driving member and said carrier, a ring gear meshing with the planet gear, a reaction sun gear meshing with the planet gear, means permitting forward rotation of the reaction gear and preventing reverse rotation thereof, a second and speed-reducing connection between the ring gear and the driving member, a second planet gear journalled on the carrier and meshing with the first planet gear, an input sun gear meshing with the second planet gear, a third and speed-reducing connection between the driving member and the input sun gear and a one-way clutch included in the third connection, the range of speed ratios of the third connection being lower than the range of speed ratios of the second connection.

6. In a power transmission in combination, a hydrodynamic torque transmitting device having a radial outflow impeller which circulates working liquid successively through a series of turbines including a pair of axial flow turbines and a radial flow turbine; an output shaft connected to the radial flow turbine; each turbine having the characteristic of providing a torque output which decreases as the speed of the turbine increases when no turbine preceding it in the series is providing torque, the first turbine to receive liquid from the impeller providing high torque output at stall, the succeeding turbines each providing torque which increases as the speed of such succeeding turbine approaches the speed of the impeller and its preceding turbine is providing torque; first means which establishes a driving connection between one of said axial flow turbines and the output shaft, said first means including a ring gear connected to said one turbine, a forwardly ratcheting reaction sun gear, a planetary carrier connected to the output shaft and a first planet gear journalled on the carrier and meshing with the sun and ring gears; and second means which establishes a driving connection between the other of said axial flow turbines and the output shaft, said second means including a second planet gear journaled on the carrier and meshing with the first planet gear, an input sun gear meshing with the second planet gear and a one-way driving connection between said other axial flow turbine and said input sun gear.

References Cited in the file of this patent

UNITED STATES PATENTS

| | | |
|---|---|---|
| 2,691,902 | Lyons | Oct. 19, 1954 |
| 2,718,796 | Gautier | Sept. 27, 1955 |
| 2,741,130 | Gerst | Apr. 10, 1956 |
| 2,795,154 | Russell | June 11, 1957 |

UNITED STATES PATENT OFFICE
CERTIFICATE OF CORRECTION

Patent No. 2,893,266　　　　　　　　　　　　　　　　　July 7, 1959

Oliver K. Kelley

It is hereby certified that error appears in the printed specification of the above numbered patent requiring correction and that the said Letters Patent should read as corrected below.

Column 5, line 58, for "higher speed ratio than" read -- lower speed ratio or higher mechanical advantage than --; column 8, line 1, for "surfaces" read -- surface --.

Signed and sealed this 17th day of November 1959.

(SEAL)
Attest:

KARL H. AXLINE　　　　　　　　　　　　　　　　　　ROBERT C. WATSON
Attesting Officer　　　　　　　　　　　　　　　　　Commissioner of Patents